(12) United States Patent
Hofer

(10) Patent No.: US 8,436,932 B2
(45) Date of Patent: May 7, 2013

(54) FOCUS TARGET DISCRIMINATION USING MULTIPLE FOCUS ZONES

(75) Inventor: Gregory Hofer, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2073 days.

(21) Appl. No.: 11/112,200

(22) Filed: Apr. 22, 2005

(65) Prior Publication Data
US 2006/0238640 A1 Oct. 26, 2006

(51) Int. Cl.
*H04N 5/232* (2006.01)

(52) U.S. Cl.
USPC ........... 348/345; 348/349; 348/353; 348/354; 348/356

(58) Field of Classification Search ............. 348/208.12, 348/224.1, 228.1, 234, 235, 345, 349, 351, 348/353, 354, 355, 356
See application file for complete search history.

(56) References Cited

U.S. PATENT DOCUMENTS

| 4,422,097 A * | 12/1983 | Inuiya ........................... 348/353 |
| 4,544,953 A * | 10/1985 | Goldman ...................... 348/356 |
| 4,841,370 A * | 6/1989 | Murashima et al. .......... 348/351 |
| 5,150,217 A * | 9/1992 | Senuma et al. ............... 348/353 |
| 2005/0185082 A1 * | 8/2005 | Lee et al. ...................... 348/345 |

* cited by examiner

*Primary Examiner* — Chieh M Fan
*Assistant Examiner* — Peter Chon

(57) ABSTRACT

A digital camera and method or algorithm that quickly determines if there are objects in a focus region of the camera that are nearer to or farther from the current focus position. Multiple focusing zones are used along with a technique that compares data from each of the focusing zones to determine distance relationships between objects in different zones.

20 Claims, 5 Drawing Sheets

Focus region having one focus zone

Fig. 8

```
                          30
                          ↓
┌─────────────────────────────────────────────────────────────────┐
│ SET A FOCUS PRIORITY THAT ESTABLISHES A FOCUS PREFERENCE        │─31
│ WHEN MULTIPLE OBJECTS AT DIFFERENT DISTANCES ARE                │
│ ENCOUNTERED (PREFERABLY THE NEAREST OR FARTHEST OBJECT)         │
└─────────────────────────────────────────────────────────────────┘
                          ↓
┌─────────────────────────────────────────────────────────────────┐
│ PERFORM A SEARCH BY MAKING FOCUS CONTRAST MEASUREMENTS          │─32
│ WHILE MOVING THE FOCUS LENS TO DIFFERENT POSITIONS              │
└─────────────────────────────────────────────────────────────────┘
                          ↓
┌─────────────────────────────────────────────────────────────────┐
│ SIMULTANEOUSLY MAKE AND ANALYZE FOCUS CONTRAST                  │─33
│ MEASUREMENTS FROM EACH OF THE FOCUS ZONES                       │
└─────────────────────────────────────────────────────────────────┘
                          ↓
┌─────────────────────────────────────────────────────────────────┐
│ CALCULATE THE SLOPE OF THE FOCUS CONTRAST AS THE LENS           │─34
│ IS MOVED AND FOCUS CONTRAST MEASUREMENTS ARE MADE               │
└─────────────────────────────────────────────────────────────────┘
                          ↓
┌─────────────────────────────────────────────────────────────────┐
│ ONCE A RELIABLE DETERMINATION OF THE SLOPE IS                   │─35
│ MADE, USE THE SLOPE TO DETERMINE THE DIRECTION                  │
│ TO THE FOCUS PEAK IN EACH ZONE                                  │
└─────────────────────────────────────────────────────────────────┘
                          ↓
┌─────────────────────────────────────────────────────────────────┐
│ IF THE DIRECTION TO THE PEAK IN ANY ZONE INDICATES THAT         │─36
│ THE PEAK IN THAT ZONE IS IN THE DIRECTION OF THE FOCUS          │
│ PRIORITY, MOVE THE FOCUS LENS IIN THAT DIRECTION                │
└─────────────────────────────────────────────────────────────────┘
                          ↓
┌─────────────────────────────────────────────────────────────────┐
│ MAKE MEASUREMENTS WHILE MOVING IN THIS                          │─37
│ DIRECTION UNTIL THE PEAK FOR THAT ZONE IS FOUND                 │
└─────────────────────────────────────────────────────────────────┘
                          ↓
┌─────────────────────────────────────────────────────────────────┐
│ ONCE THIS PEAK FOR THE ZONE IS FOUND, CHECK THE OTHER           │─38
│ ZONES FOR TAILS OF PEAKS THAT INDICATE THAT THERE IS ANOTHER    │
│ PEAK THAT IS EVEN FURTHER IN THE FOCUS PRIORITY DIRECTION       │
└─────────────────────────────────────────────────────────────────┘
                          ↓
┌─────────────────────────────────────────────────────────────────┐
│ IF SUCH A TAIL IS FOUND IN ANOTHER ZONE, CONTINUE THE           │─39
│ SEARCH UNTIL THE ZONE WITH A PEAK THAT IS THE FURTHEST          │
│ IN THE DIRECTION OF THE FOCUS PRIORITY IS FOUND                 │
└─────────────────────────────────────────────────────────────────┘
                          ↓
┌─────────────────────────────────────────────────────────────────┐
│ IF, AT THE BEGINNING OF THE SEARCH, THERE ARE NO TAILS THAT     │─40
│ INDICATE PEAKS IN THE DIRECTION OF THE FOCUS PRIORITY, CONDUCT  │
│ THE SEARCH IN A DIRECTION AWAY FROM THE FOCUS PRIORITY          │
│ DIRECTION UNTIL THE FIRST PEAK IN THAT DIRECTION IS FOUND       │
└─────────────────────────────────────────────────────────────────┘
```

FOCUS TARGET DISCRIMINATION USING MULTIPLE FOCUS ZONES

TECHNICAL FIELD

The present invention relates generally to digital cameras and methods that provide for focus target discrimination.

BACKGROUND

A common problem encountered in digital camera focusing systems is that of detecting when there are multiple objects at different distances within the focus region and once detected, properly choosing which object to focus on. Previous methods required extensive searching to determine if there were objects nearer or farther than the current focus position.

Because of the extensive search times that are required, this type of focus determination is many times not performed because of the desire for better camera performance. Thus, the focus system may not be aware that there are other objects in the focus region that could be focused upon. This can result in focusing on an object that is not the desired object that the user intended to focus on.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which:

FIG. 8 is a flow diagram that illustrates a detailed embodiment of the method or algorithm;

DETAILED DESCRIPTION

Figure 1:
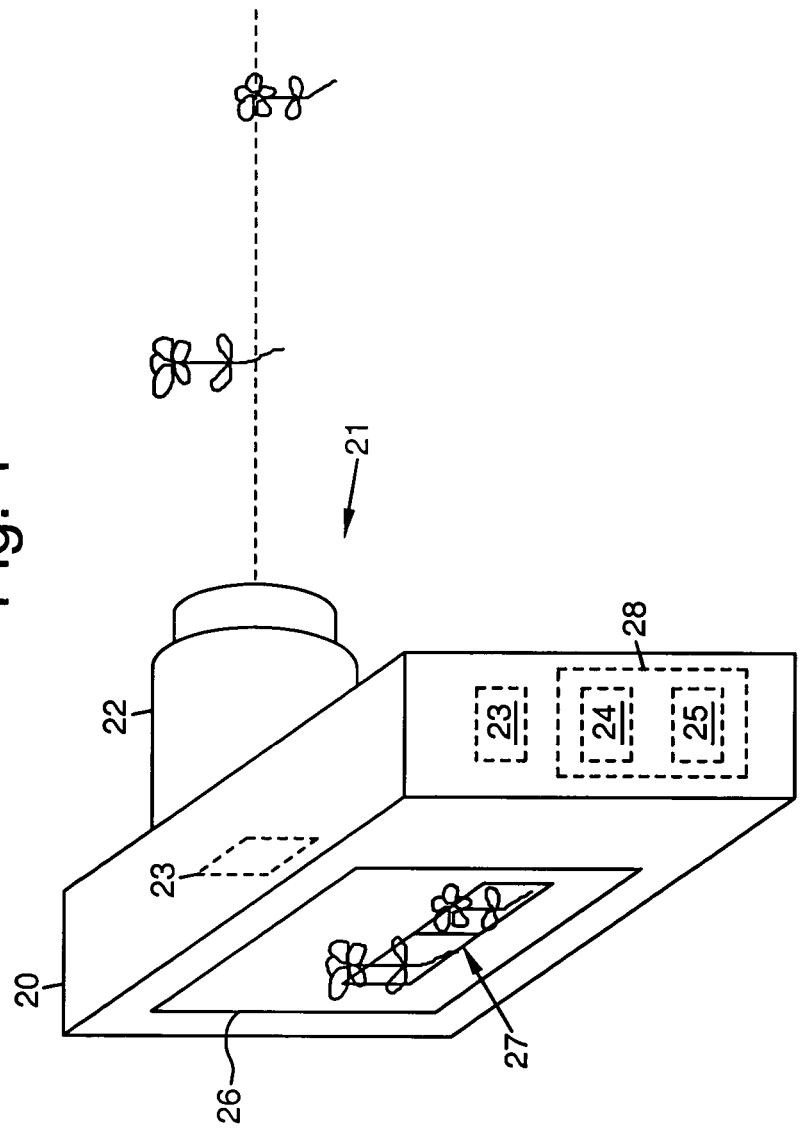
FIG. 1 illustrates an exemplary image capture device implemented in accordance with the principles of the present invention.

Referring to the drawing figures, FIG. 1 illustrates an exemplary image capture device 20, such as a digital camera 20, for example, implemented in accordance with the principles of the present invention. The image capture device 20 comprises a focus system 21 including a lens 22 having the ability to move a focus element to adjust focus distance. The image capture device 20 comprises a focus sensor 23 having the ability to measure degree of focus in multiple regions of an image scene. The focus sensor 23 may be a dedicated device or it may utilize an imaging sensor.

The image capture device 20 comprises an algorithm 24 to control the lens focus element based on focus sensor data to focus on image scene objects. The image capture device 20 comprises a viewfinder 26, such as a liquid crystal display (LCD) 26, for example, that displays the image scene and a focus region overlay 27. The image capture device 20 comprises an algorithm 25 in accordance with the principles of the present invention that identifies focus peaks in an image. The image capture device 20 may comprise a CPU 28 or microprocessor 28 that implements the algorithms 24, 25.

Figure 2:
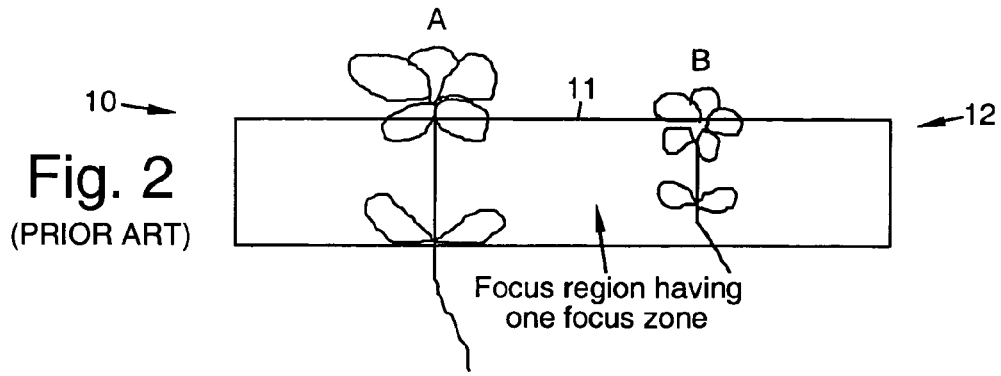
FIG. 2 illustrates an exemplary single focus zone of a conventional focusing system containing multiple objects.

FIG. 2, shows two objects, object A and object B, as projected onto the image plane of a conventional digital camera 10. A conventional focus region 11 comprised of a single focus zone of a basic conventional focus system 12 (including a focus lens) of a digital camera 10 (generally designated) is shown overlaid on the object image encompassing portions of the two objects. The conventional focus region 11 represents the portion of the scene image that is projected onto a dedicated focus sensor or onto a portion of the image sensor and is used to generate focus measurement data. The two objects in this illustration are the same physical size, but are at two different distances from the camera 10. This image plane image and focus region representation may be displayed on a digital camera viewfinder or LCD. The focus system 11 adjusts focus by making a focus measurement within a focus region and then adjusts a focus element in the digital camera lens until maximum focus is achieved. The focus measurement is typically a measure of contrast, but can be a measure of frequency content or other measure.

Figure 3:
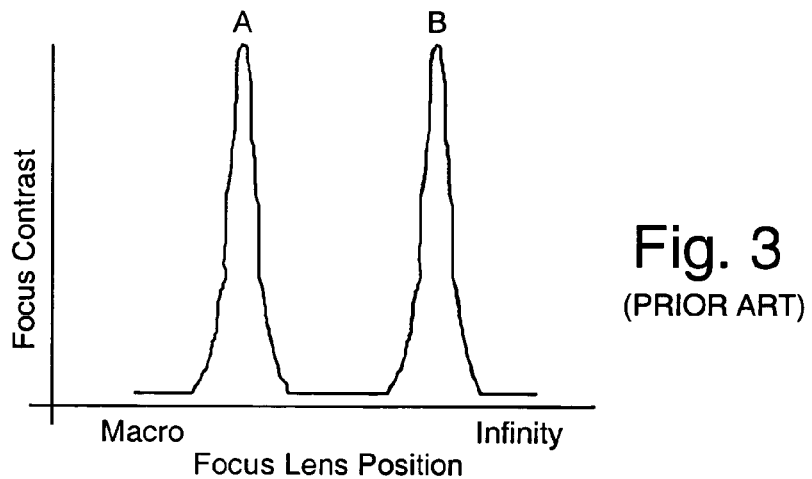
FIG. 3 illustrates a representative focus trace showing focus contrast versus focus lens position for the exemplary case shown in FIG. 2.

FIG. 3 shows a representative trace of focus contrast versus focus lens position for the range of lens positions corresponding to focus distances from Macro to Infinity for the exemplary case illustrated in FIG. 2. Peak A corresponds to the focus lens position where Object A is in best focus, and peak B corresponds to the best focus position for Object B. If the focus lens position is initially at a focus lens position corresponding to the vicinity of peak B, a focus search algorithm of the focus system 11 is not aware of the existence of the focus peak from object A without moving the focus lens from the vicinity of peak B to the vicinity of peak A. In fact, in order to determine if there are any objects that are closer to the camera than object B, the focus system 11 would have to scan the entire lens position range from the vicinity of the lens position of peak B to Macro. This requires significant time and thus reduces the overall performance of the camera 10.

Figure 4:
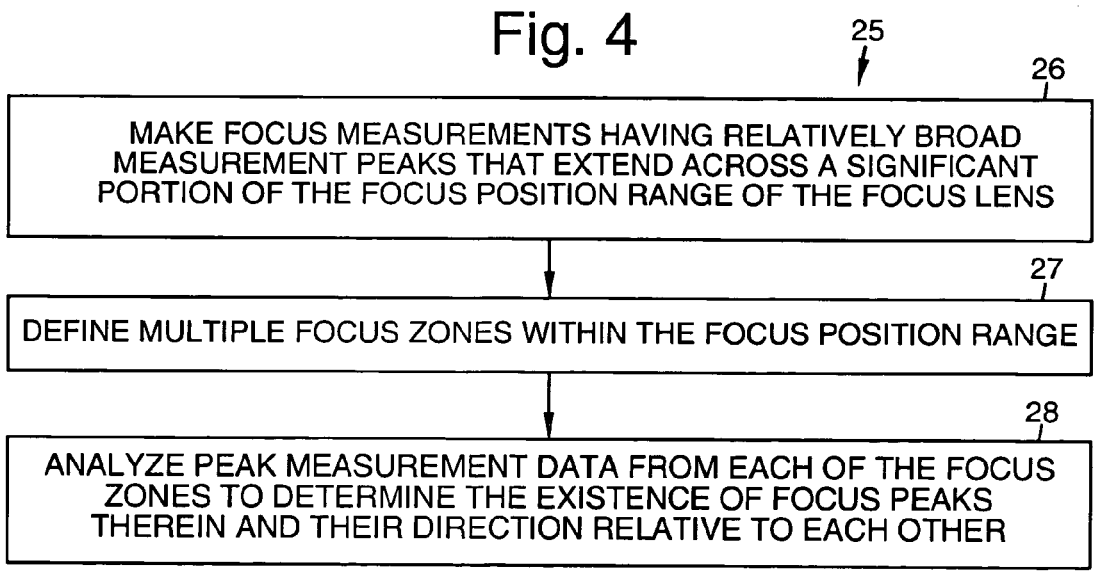
FIG. 4 is a flow diagram that illustrates an exemplary embodiment of a method or algorithm in accordance with the principles of the present invention.

There are three primary components to the present invention that make it possible to detect the presence and relative direction of another focus peak without actually searching through the vicinity of this other focus peak. This is illustrated in FIG. 4, which is a flow diagram that illustrates an exemplary embodiment of a method 25 or algorithm 25 in accordance with the principles of the present invention. The method 25 or algorithm 25 identifies focus peaks in an image.

The components of the method 25 or algorithm 25 are: 1) making the measurement peaks (contrast peaks, for example) broader 26 so that the effect (or tail) of a peak extends across a significant portion of the focus lens position range, 2) splitting 27 the focus region up into multiple focus zones so that individual, but overlapping peaks can be separated from one another, and 3) analyzing 28 the peak data (such as contrast data) from each of the focus zones to determine the existence of other focus peaks and their directions. A detailed method 30 or algorithm 30 for analyzing 28 the peak data is illustrated in FIG. 8.

Figure 5:
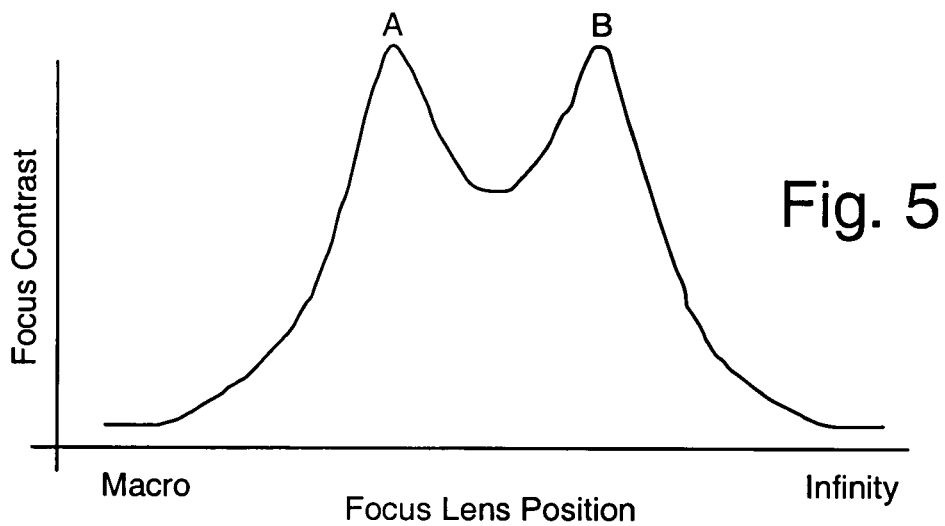
FIG. 5 illustrates the focus trace shown in FIG. 3 but with broader peaks.

FIG. 5 shows a focus trace as is shown in FIG. 3, except the focus peaks are wider. The focus peaks shown in FIG. 3 may be generated by a generally well-known technique of summing the differences of immediately adjacent pixels in the focus region. This is a differentiation operation that looks primarily at the high frequency content of the focus region.

Broadening the peaks is basically done using lower frequency components in the derivation of the focus contrast measure. This can be done a number of different ways, including sub-sampling the focus region or by using filters that allow lower frequency content into the contrast measure computation. Adding low frequency components to the focus contrast derivation increases the amplitude of the focus contrast measure at focus lens positions further away from the focus peak because the image frequency content drops to lower frequencies as the image defocuses. This has the effect of broadening the focus contrast peak and extending the amplitude of the tails of the peak.

With just this change, it is still somewhat difficult to detect that there is another peak at A when the focus lens is positioned in the vicinity of peak B. The next component of the present invention is to split the focus region into multiple focus zones.

Figure 6:
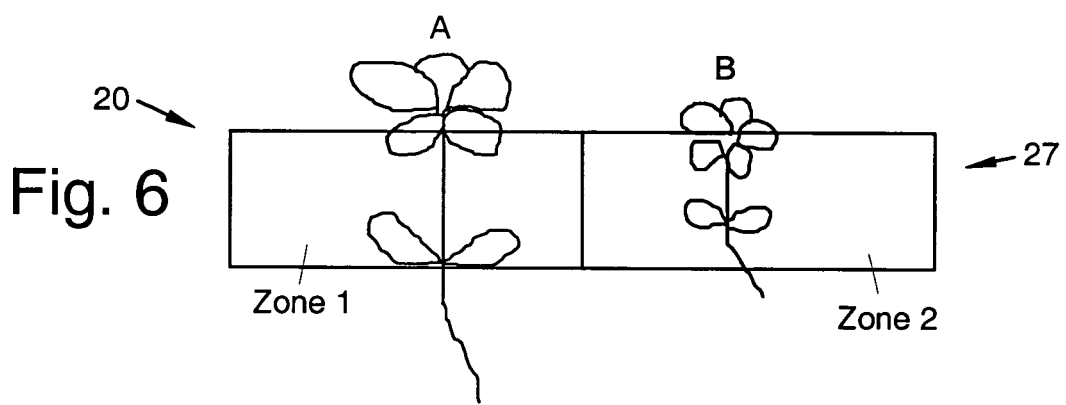
FIG. 6 illustrates a focus region split into two focus zones in accordance with the principles of the present invention.

FIG. 6 shows an embodiment of a digital camera 20 in accordance with the present invention having a focus system 21 (including a focus lens 22). In the embodiment shown in FIG. 6, the focus region is split into two focus zones (Zone 1, Zone 2), for example. One of the objects is located in the first zone (Zone 1), while the other object is located in the second zone (Zone 2).

Figure 7:
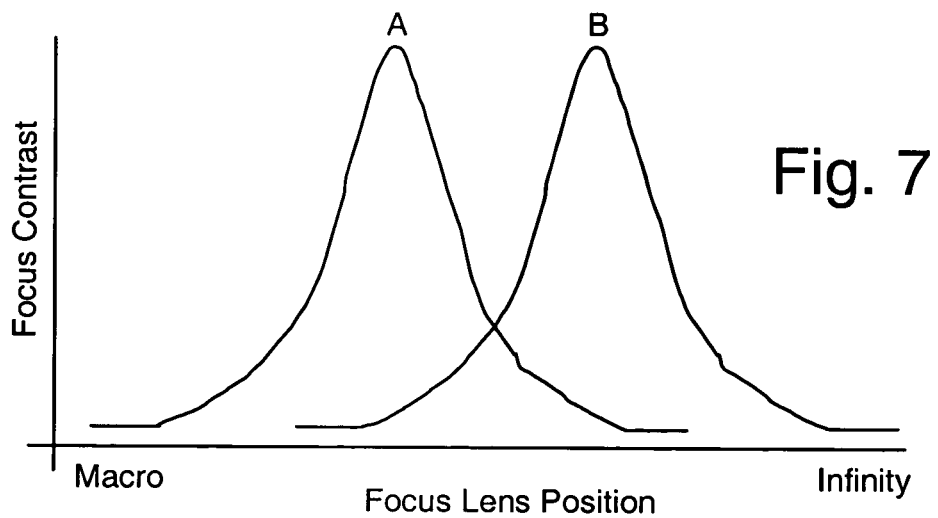
FIG. 7 illustrates a representative focus trace for the exemplary case shown in FIG. 6 having the focus region split into two focus zones.

A focus contrast trace is made separately from each of these zones and overlaid on the same plot, as is shown in FIG. 7. Considering the previous situation of the focus lens positioned in the vicinity of correct focus for object B, it is now easily discernable that there is another peak, A, because of the presence of the tail of peak A in the vicinity of peak B. The number of zones can be extended from 2 to multiple zones to increase the ability to discern individual focus distances of multiple objects.

The last component of the present invention is a method 30, or algorithm 30, for analyzing 28 the peak data from each of the focus zones to find the desired peak. FIG. 8 is a flow diagram that illustrates an exemplary embodiment of the method 30 or algorithm 30. The exemplary embodiment of the method 30 or algorithm 30 is implemented as follows.

A focus priority is set 31 that establishes a focus preference when multiple objects at different distances are encountered. The focus priority is preferably either the nearest object or the farthest object. A search is performed 32 that involves making focus measurements, such as focus contrast measurements, for example, while moving the focus lens to different positions. The search can start at any focus lens position.

Focus contrast measurements are simultaneously made 33 from each of the focus zones and are analyzed. As the lens is moved and focus contrast measurements are made, the slope of the focus contrast is calculated 34. Once a reliable determination of the slope is made, the slope is used to determine 35 the direction to the focus peak in each zone. If the direction to the peak in any zone indicates that the peak in that zone is in the direction of the focus priority, the focus lens is moved 36 in that direction.

Measurements are made 37 while moving in this direction until the peak for that zone is found. Once this peak for the zone is found, the other zones are checked 38 for tails of peaks that indicate that there is another peak that is even further in the focus priority direction. If such a tail is found in another zone, the search continues 39 in this manner until the zone with a peak that is the furthest in the direction of the focus priority is found.

If, at the beginning of the search, there are no zones with tails that indicate peaks in the direction of the focus priority, but there are zones with tails that indicate peaks in the opposite direction of focus priority, the search is conducted 40 in a direction away from the focus priority direction until the first zone with a peak in that direction is found.

The main characteristic of this search is that while a peak is being searched in a zone, other zones are checked for the existence of tails of other peaks that might indicate the existence of another peak further in the direction of the focus priority than the current zone being searched. If such a peak tail is detected in another zone, the search switches to that zone and continues until that peak is found or a switch is made to another zone peak. In this way, the objects furthest in the direction of the focus priority can be quickly and efficiently found without requiring a complete search of the focus lens position range.

Figure 9:
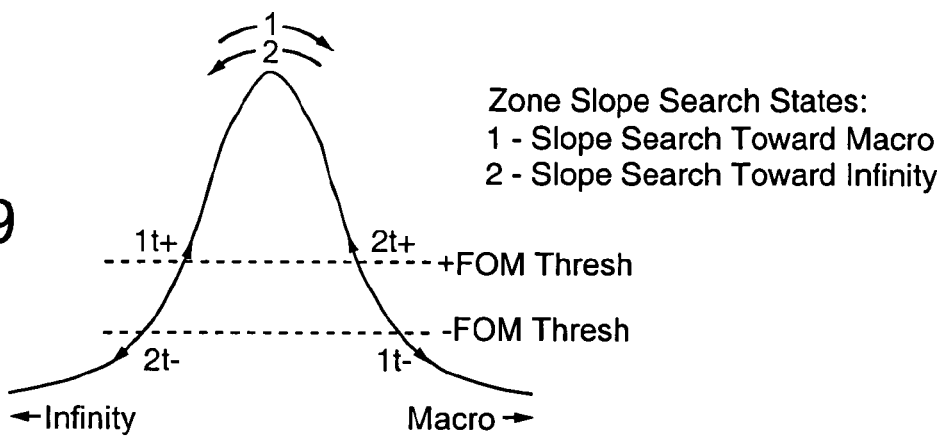
FIG. 9 illustrates an exemplary slope search figure-of-merit (FOM) trace.
Figure 10:
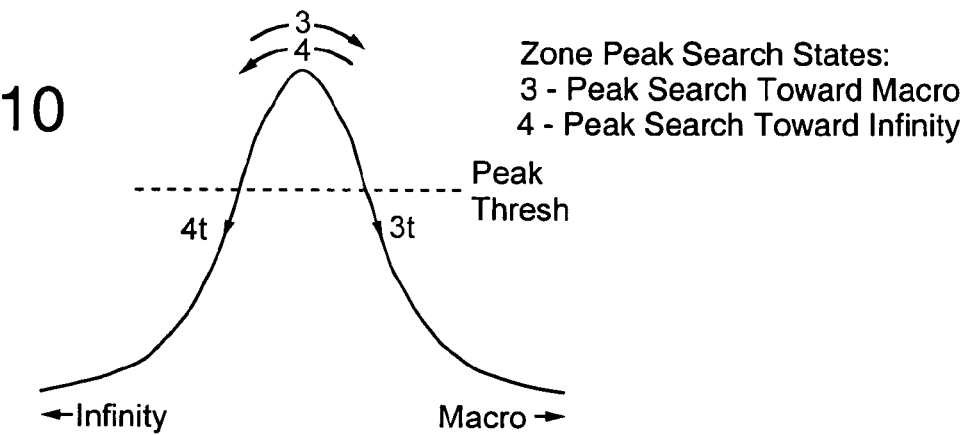
FIG. 10 illustrates an exemplary peak slope search FOM trace.

Additional details regarding the searching for peaks are provided below with reference to FIGS. 9-11. FIG. 9 illustrates an exemplary slope search figure-of-merit (FOM) trace. This trace illustrates aspects of measuring the slope of the figure-of-merit to determine the direction to a peak in one of the multiple focus region zones being searched. The measurement and search shown in this figure for one zone is performed simultaneously in each of the multiple focus region zones. An embodiment of the slope search phase of the present invention is as follows.

Referring to FIG. 9, the search starts at the previous best focus position and searches toward the focus priority direction. A +FOM Threshold and −FOM Threshold is established for each zone based on each zone's starting figure-of-merit. Multiple zones are analyzed simultaneously, each maintaining its own search state and thresholds.

One zone is designated as a control zone. This zone determines the next move position and the overall search phase. Generally, this is the zone that indicates a peak in the focus priority direction.

The search continues until the figure-of-merit crosses a +Threshold or −Threshold. The search alternates directions if no thresholds are found. If searching in the direction opposite the focus priority direction and the threshold that is crossed indicates a peak in the focus priority direction, the direction is reversed to search in the focus priority direction for the peak in this zone. If the threshold that is crossed indicates a peak opposite the focus priority direction, the search is conducted in the direction opposite the focus priority for the peak in this zone only if there are no other zones that are close to indicating a peak in the focus priority direction.

Once a threshold is crossed and a decision is made to search a peak, control transitions from the slope search phase to the peak search phase. While the overall search transitions to the peak search phase, individual zones may still be in the slope search state. The overall search phase is determined by the search state of the control zone.

Details of the slope search are as follows.

There are two zone slope search states: state 1, slope searching toward the focus priority direction, and state 2, slope searching away from the focus priority direction. The search begins in zone search state 1, but may alternate between states 1 and 2 if thresholds are not found. Since the +Threshold and −Threshold are established above and below the initial FOM measurement, the two possible starting regions illustrated in FIG. 9 would be the region between 1t+ and 2t− and the region between 2t+ and 1t−. From these starting regions, there are four possible threshold crossing cases. The focus priority direction is set to Macro in the following description.

If a −Threshold is crossed as shown in cases 1t− or 2t−, this indicates going away from a peak in this zone. Case 2t−: Search begins in the region between 2t− and 1t+, moves in the Infinity direction, and crosses the −Threshold. This indicates a peak in the opposite, or Macro direction in this zone. Make this zone the control zone, reverse direction, transition to the peak search phase, and search toward the macro peak. When reversing direction, the lens position can skip over positions already searched. Case 1t−: Search begins in the region between 2t+ and 1t−, moves in the Macro direction, and crosses the −Threshold. This indicates a peak in the opposite, or Infinity direction for this zone. If there are no other zones close to crossing the +Threshold (1t+case) indicating a possible macro peak in another zone, make this zone the control zone, reverse directions, transition to the peak search phase, and search for the Infinity peak indicated in this zone.

If a +Threshold is crossed as shown in cases 1t+ or 2t+, this indicates going toward a peak in this zone. Case 1t+: Search begins in the region between 2t− and 1t+, moves in the Macro direction, and crosses the +Threshold. This indicates a peak in the same, or Macro direction. Set this zone as the control zone, transition to the peak search phase, and continue searching in same direction toward the macro peak. Case 2t+: Search begins in the region between 2t+ and 1t−, moves in the Infinity direction, and crosses the +Threshold. This indicates a peak in the same, or Infinity direction. If there are no other zones close to crossing the −Thresh (2t− case) indicating a possible macro peak in another zone, make this zone the control zone, transition to the peak search phase and continue searching in this direction toward the infinity peak.

If all zones fail to detect a slope threshold, a focus error is generated.

Zones that have completed the slope search phase, then transition to the peak search phase. The slope search phase determined the direction to a peak; the peak search phase continues to search for a peak in the direction indicated by the slope search phase until the peak is found. FIG. 10 illustrates an exemplary peak search figure-of-merit (FOM) trace. This trace illustrates aspects of measuring the figure-of-merit to determine when a peak in one of the multiple focus region zones being searched has been found. The measurement and search shown in this figure for one zone is performed simultaneously in each of the multiple focus region zones that are in the peak search state. The exemplary peak search is conducted as follows.

A peak threshold is established for each zone in the peak zone search state. It is based on the max FOM seen in each zone. As in the slope search phase, multiple zones are analyzed simultaneously (some of which may still be in the slope search state), with one zone being determined as the control zone.

The search continues until the FOM drops below the peak threshold. If there are other zones that indicate potential peaks, the control zone transitions to one of them. If there are no other zones with potential peaks, the peak closest to the focus priority direction has been found and the peak search is completed.

Details of the peak search are as follows.

There are two zone peak search states: state 3, peak searching toward the focus priority direction, and state 4, peak searching away from the focus priority direction The search begins in zone search state 3 or 4, depending on the direction to the peak as determined in the slope search phase for this zone. The peak threshold is adjusted independently for each zone to be a percentage of the max FOM seen thus far in that zone. The peak search starting region would be the region above the peak threshold illustrated in FIG. 10. From this starting region, there are two possible threshold crossing cases, case 3t and case 4t. Case 3t: Peak search begins in the region above the peak threshold and searches for the peak in the Macro direction and crosses the peak threshold at 3t. Case 4t: As in case 3t, the peak search begins in the region above the peak threshold and searches for the peak in the Infinity direction and crosses the peak threshold at 4t. Crossing the peak threshold at either 3t or 4t indicates that the peak for this zone has been found.

While the control zone is searching for a peak for either case 3t or 4t described above, it is possible that control may switch to other zones that have just completed the slope search state and indicate a peak at a more macro position than the current control zone.

Once the peak threshold 3t or 4t is crossed in a particular zone, checks are made for the following cases to determine if there are any other zones with potential peaks that need to be searched. Case 1: Any other zones that are searching a peak in the focus priority direction. Case 2: Any other zones that are searching a peak away from the focus priority direction that have a potential peak FOM that is significantly greater than the current peak FOM.

Control at this point transitions to another zone with a potential peak to search, such as case 1 or 2 described above. If there are no other peaks to search, the peak search is complete. If the end of the search range is hit before qualifying a peak, control transitions, first, to another zone searching a peak, or, second, to another zone searching a slope. If all zones fail to find a peak threshold, a focus error is generated.

The zone in which a peak is found that is closest to the focus priority search direction is the zone that will be used to lock focus and is referred to as the locked zone. This means that focus will be locked at the focus distance associated with the center of the peak found in this zone Peak search considerations in determining the locked focus zone(s) are discussed with reference to FIG. 11, which illustrates an exemplary multi-zone FOM trace example. Again, the focus priority direction in this example has been designated as closest focus priority or in the Macro direction.

Figure 11:
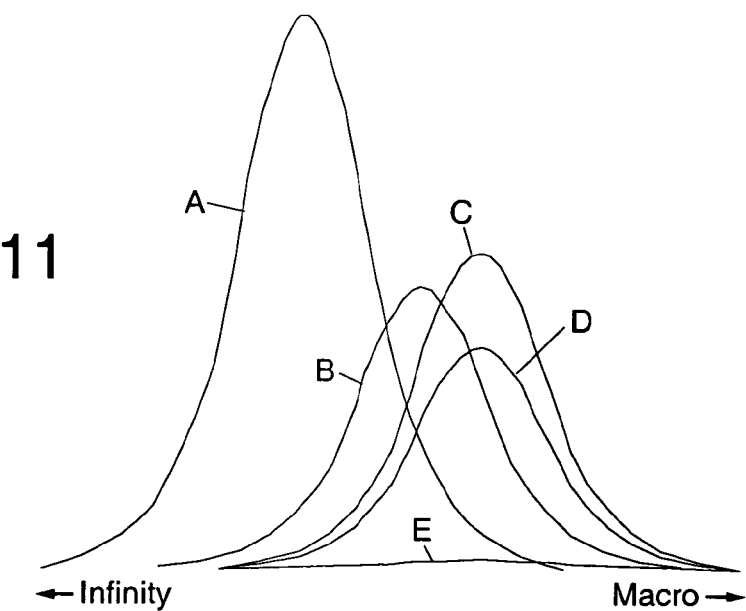
FIG. 11 illustrates an exemplary multi-zone FOM trace example.

FIG. 11 illustrates a case of 5 zones with objects at 3 distances. The multizone focus search algorithm tries to lock focus on the objects closest to macro, or in this case, zones C, D, and E. If there are multiple zones that are closest to macro (all have peaks at the same focus distance), they are generally all selected as locked zones.

An exception to this is illustrated by zone E. Note that the peak FOM for this zone is much smaller than the peak FOMs for zones C and D. If the max FOM value for a locked zone is not a significant percentage of the highest FOM of all locked zones, this zone will not be included as one of the locked zones. This helps to eliminate focus lock around objects with insignificant contrast.

Even though the object in Zone A has more contrast (higher FOM) than the other zones, it will not be chosen as the locked zone because the object at this distance is in the direction opposite the focus priority direction for this example. However, if the max peak FOM value for Zone A becomes significantly greater than the highest macro peak (Zone C in this case), Zone A will become the locked zone and zones C-E will not. This prevents near objects with very weak contrast from dominating far objects with very high contrast.

The present invention thus provides for improved image capture devices, such as digital cameras, and an efficient method or algorithm for determining if there are objects at multiple distances in a focus region of the camera. The present invention provides a way to quickly detect if there are objects at multiple distances in the focus region and which direction they are relative to the current focus position so that an object of desired focus priority can be chosen. This provides the focus system of the digital camera with the opportunity to correctly choose the desired focus object without sacrificing performance.

Thus, image capture devices, such as digital cameras, methods and algorithms that provide focus target discrimination have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. An image capture device comprising:
   a focus system having a focus lens with a predefined focus position range; and
   an algorithm that:
   makes focus measurements having a relatively broad focus response that extends across a significant portion of the focus position range of the focus lens;
   defines multiple focus zones within the focus region; and
   analyzes focus measurement data from each of the focus zones to determine the existence of maximum focus peaks therein and their direction relative to each other in order to find furthest objects quickly and efficiently without requiring a complete search of the focus lens position range, wherein the analysis is implemented by calculating a slope of focus contrast as the lens is moved and focus contrast measurements are made, and determining a direction to a focus peak in each zone using the calculated slope.

2. The device recited in claim 1 wherein the analysis is implemented by:
   setting a focus priority that establishes a focus preference when multiple objects at different distances are encountered;
   performing a search by making focus measurements while moving the focus lens to different positions;
   simultaneously making the focus contrast measurements from each of the focus zones;
   if the direction to the focus peak in a zone indicates that it is in the direction of the focus priority, moving the lens in that direction;
   making measurements while moving in this direction until the peak for the zone is found;
   once the peak for the zone is found, checking the other zones for another peak that is even further in the focus priority direction; and
   if such a peak is found in another zone, continuing the search until the zone with a peak that is the furthest in the direction of the focus priority is found.

3. The device recited in claim 2 wherein if, at the beginning of the search, there are no zones with tails that indicate peaks in the direction of the focus priority, but there are zones with tails that indicate peaks in the opposite direction of focus priority, the search is conducted in the direction away from the focus priority direction until the first peak in that direction is found.

4. The device recited in claim 2, wherein the focus priority is either the nearest object or the farthest object.

5. The device recited in claim 1 wherein the focus measurement comprises a focus contrast measurement.

6. The device recited in claim 1 wherein the relatively broad measurement peaks are produced by using lower frequency components in the focus contrast measurement.

7. The device recited in claim 5 wherein the focus contrast measurement comprises sub-sampling the focus region to provide lower frequency components in the focus contrast measurement.

8. The device recited in claim 1 wherein the focus measurement comprises a frequency content measurement.

9. The device recited in claim 8 wherein the frequency content measurement comprises using filters that allow lower frequency content into the contrast measure computation.

10. A method, for use in a digital camera having a focus lens with a predefined focus position range, that identifies focus peaks in an image, comprising:
    making focus measurements having a relatively broad focus response that extends across a significant portion of the focus position range of the focus lens;
    defining multiple focus zones within the focus region; and
    analyzing focus measurement data from each of the focus zones to determine the existence of maximum focus peaks therein and their direction relative to each other, the analyzing calculating a slope of focus contrast as the lens is moved and focus contrast measurements are made, and determining the direction to a focus peak in each zone using the calculated slope.

11. The method recited in claim 10 wherein the analyzing further comprises:
    setting a focus priority that establishes a focus preference when multiple objects at different distances are encountered;
    performing a search by making focus measurements while moving the focus lens to different positions;
    simultaneously making focus contrast measurements from each of the focus zones;
    if the direction to the focus peak in a zone indicates that it is in the direction of the focus priority, moving the lens in that direction;
    making measurements while moving in this direction until the peak for the zone is found;
    once the peak for the zone is found, checking the other zones for tails of peaks that indicate that there is another peak that is even further in the focus priority direction; and
    if such a tail is found in another zone, continuing the search until the zone with a peak that is the furthest in the direction of the focus priority is found.

12. The method recited in claim 11 wherein if, at the beginning of the search, there are no zones with tails that indicate peaks in the direction of the focus priority, but there are zones with tails that indicate peaks in the opposite direction of focus priority, the search is conducted in the direction away from the focus priority direction until the first peak in that direction is found.

13. The method recited in claim 11 wherein the focus priority is either the nearest object or the farthest object.

14. The method recited in claim 10 wherein the focus measurement comprises a focus contrast measurement.

15. The method recited in claim 10 wherein the relatively broad measurement peaks are produced by using lower frequency components in the focus contrast measurement.

16. The method recited in claim 14 wherein the focus contrast measurement comprises sub-sampling the focus region to provide lower frequency components in the focus contrast measurement.

17. The method recited in claim 10 wherein the focus measurement comprises a frequency content measurement.

18. The method recited in claim 10 wherein the focus contrast measurement comprises using filters that allow lower frequency content into the contrast measure computation.

19. Imaging apparatus comprising:
focusing means comprising a focus element having a predefined focus position range; and
an algorithm that:
makes focus measurements having a relatively broad focus response that extends across a significant portion of the focus position range of the focus lens;
defines multiple focus zones within the focus region; and
analyzes focus measurement data from each of the focus zones to determine the existence of maximum focus peaks therein and their direction relative to each other by calculating a slope of the focus contrast as a focus element is moved and focus contrast measurements are made, and determining the direction to the focus peak in each zone using the calculated slope.

20. The apparatus recited in claim 19 wherein the analysis is implemented by:
setting a focus priority that establishes a focus preference when multiple objects at different distances are encountered;
performing a search by making focus measurements while moving the focus element to different positions;
simultaneously making focus contrast measurements from each of the focus zones;
if the direction to the focus peak in a zone indicates that it is in the direction of the focus priority, moving the focus element in that direction;
making measurements while moving in this direction until the peak for the zone is found;
once the peak for the zone is found, checking the other zones for another peak that is even further in the focus priority direction; and
if such a peak is found in another zone, continuing the search until the zone with a peak that is the furthest in the direction of the focus priority is found.

* * * * *

UNITED STATES PATENT AND TRADEMARK OFFICE
CERTIFICATE OF CORRECTION

PATENT NO.         : 8,436,932 B2
APPLICATION NO.    : 11/112200
DATED              : May 7, 2013
INVENTOR(S)        : Gregory Hofer Page 1 of 1

It is certified that error appears in the above-identified patent and that said Letters Patent is hereby corrected as shown below:

In the Claims:

In column 7, line 32, in Claim 1, delete "furthest" and insert -- farthest --, therefor.

In column 7, line 57, in Claim 2, delete "furthest" and insert -- farthest --, therefor.

In column 8, line 48, in Claim 11, delete "furthest" and insert -- farthest --, therefor.

In column 10, line 19, in Claim 20, delete "furthest" and insert -- farthest --, therefor.

Signed and Sealed this
Thirteenth Day of August, 2013

Teresa Stanek Rea
*Acting Director of the United States Patent and Trademark Office*